(12) United States Patent
Yasui et al.

(10) Patent No.: US 6,825,779 B2
(45) Date of Patent: Nov. 30, 2004

(54) RENDERING DEVICE

(75) Inventors: Nobuhiko Yasui, Moriguchi (JP);
Takashi Yoshida, Hirakata (JP);
Atsushi Iisaka, Katano (JP); Akira Ishida, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 564 days.

(21) Appl. No.: 09/885,095

(22) Filed: Jun. 21, 2001

(65) Prior Publication Data

US 2002/0097170 A1 Jul. 25, 2002

(30) Foreign Application Priority Data

Jun. 30, 2000 (JP) ........................................ 2000-199512
Jun. 30, 2000 (JP) ........................................ 2000-199513

(51) Int. Cl.$^7$ ............................................. G08G 1/123
(52) U.S. Cl. ............................ 340/988; 340/435; 701/1
(58) Field of Search ................................. 340/988, 989, 340/435, 436, 438, 439; 701/1, 41

(56) References Cited

U.S. PATENT DOCUMENTS

| | | | |
|---|---|---|---|
| 5,343,206 A | | 8/1994 | Ansaldi et al. |
| 5,949,331 A | * | 9/1999 | Schofield et al. ........... 340/461 |
| 6,218,960 B1 | * | 4/2001 | Ishikawa et al. ............ 340/901 |
| 6,366,221 B1 | * | 4/2002 | Iisaka et al. ............. 340/932.2 |
| 6,369,701 B1 | * | 4/2002 | Yoshida et al. ............. 340/435 |
| 6,483,442 B2 | * | 11/2002 | Shimizu et al. .......... 340/932.2 |
| 6,539,288 B2 | * | 3/2003 | Ishida et al. .................... 701/1 |
| 6,587,760 B2 | * | 7/2003 | Okamoto ....................... 701/1 |

FOREIGN PATENT DOCUMENTS

| | | |
|---|---|---|
| EP | 0 835 796 | 4/1998 |
| EP | 0 841 648 | 5/1998 |
| FR | 2 785 383 | 5/2000 |
| GB | 2 320 326 | 6/1998 |
| JP | 64-014700 | 1/1989 |
| JP | 2-36417 | 8/1990 |
| JP | 2000-177512 | 6/2000 |
| JP | 2001-010427 | 1/2001 |
| JP | 2001-122059 | 5/2001 |
| WO | 96/38319 | 12/1996 |

OTHER PUBLICATIONS

Patent Abstracts of Japan, entitled "Rear View Display Unit For Vehicle", vol. 013, No. 441 (M–876), (JP 01–168583, Apr. 1989).

Patent Abstracts of Japan, entitled "Driving Supporting Device for Vehicle", vol. 2000, No. 08, (JP 2000–127851, May 2000).

Patent Abstracts of Japan, entitled "Parking Auxiliary Device", vol. 2000, No. 03, (JP 11–334470, Dec. 1999).

* cited by examiner

Primary Examiner—John Tweel
(74) Attorney, Agent, or Firm—Wenderoth, Lind & Ponack, L.L.P.

(57) ABSTRACT

In a rendering device, a processor derives an estimated path to be traced by the left- and right-rear wheels of a vehicle based on a rudder angle that is provided by a rudder angle sensor. The processor then determines positions for overlaying indicators on the derived estimated path. The processor then renders the indicators on the determined points in a captured image which is provided by an image capture device, and generates a display image. In the display image, the indicators move along the estimated path in the direction the vehicle is heading towards. In this manner, the estimated path in the display image that is generated by the rendering device becomes noticeable for a driver of the vehicle.

16 Claims, 13 Drawing Sheets

F I G. 10
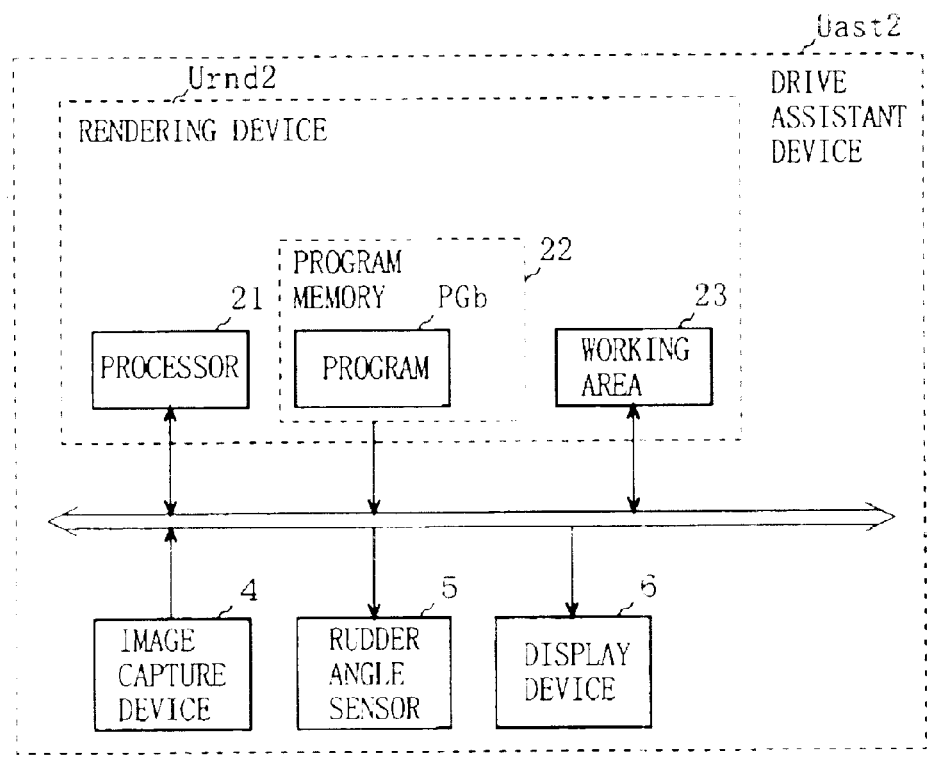
F I G. 11
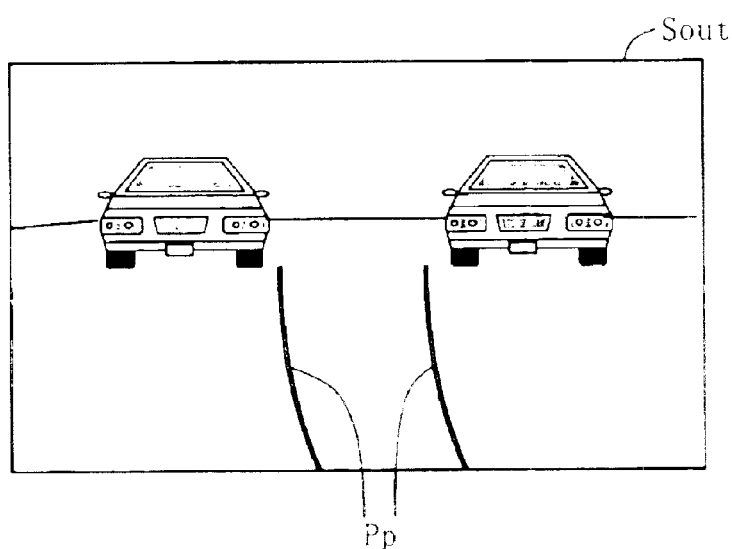

F I G. 1 9
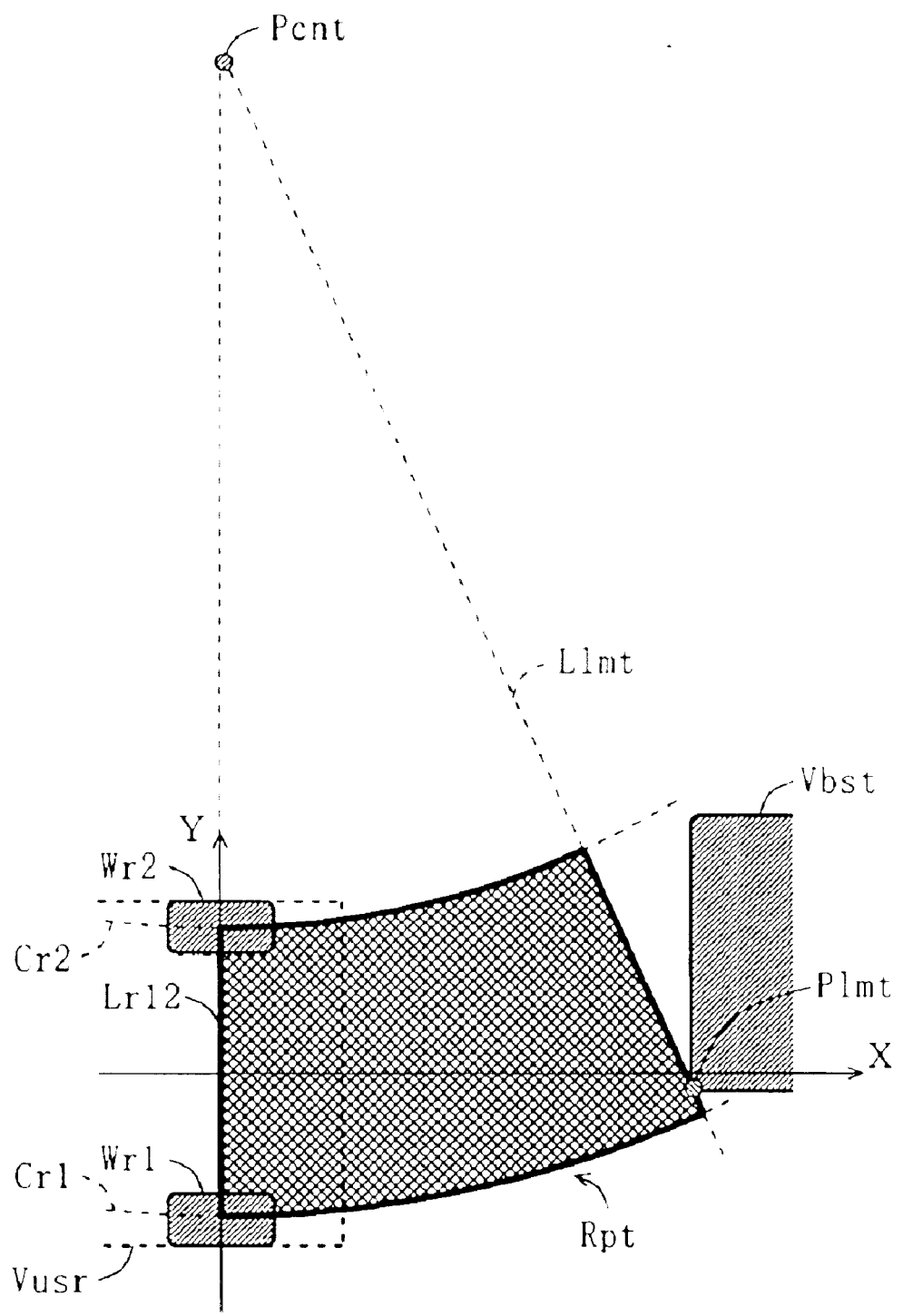

RENDERING DEVICE

BACKGROUND OF THE INVENTION

FIELD OF THE INVENTION

The present invention relates to rendering devices and, more specifically, to a rendering device which can be incorporated in a drive assistant device. In more detail, the rendering device generates a display image of an area around a vehicle based on an image that is captured by an image capture device fixedly placed in the vehicle.

DESCRIPTION OF THE BACKGROUND ART

The drive assistant device incorporating such a rendering device as described above has been actively researched and developed. A conventional-type drive assistant device is mounted in a vehicle, and generally includes an image capture device, a rudder angle sensor, a computing unit, a rendering device, and a display device. The image capture device is fixedly placed in a predetermined position in the vehicle, and the image capture device is provided for capturing an image of an area that is defined by the viewing angle of the image capture device. The resulting image is hereinafter referred to as a captured image. The rudder angle sensor is also fixed in a predetermined position in the vehicle, and detects to what degree the steering wheel of the vehicle is turned. Based on the detection result, the computing unit calculates an estimated path for the vehicle to take. The rendering device then renders the estimated path on the captured image, and the image generated thereby is a display image such as the one shown in FIG. 20. The display image is displayed on the display device.

With such a display image on the display device, a driver of the vehicle can know if his/her current steering will fit the vehicle in a parking space without colliding into any obstacle in a close range of the driver's vehicle. If his/her steering is not appropriate, the estimated path is displayed out of the parking space in the display image. Therefore, the driver can appropriately adjust the rudder angle of the steering wheel.

There is another type of conventional drive assistant device exemplarily disclosed in Japanese Patent examined Publication No. 2-36417 (1990-36417). The drive assistant device additionally carries an active sensor for measuring a distance between the vehicle and an obstacle that is observed near the estimated path. Based on the measurement result provided by the active sensor, the computing unit determines which part of the estimated path is to be rendered on the captured image. The part which is determined to be rendered on the captured image is hereinafter referred to as a rendering estimated path. In this manner, the rendering device accordingly renders on the captured image the rendering estimated path, which ends right before the obstacle.

The above-described conventional drive assistant devices have the following two problems. First, the estimated path is fixedly determined in color for display. Thus, even if the color is similar in tone to a predominant color of the display image, the color is unchangeable. Here, the predominant color is mainly determined by the road, for example, regardless of whether the road paved or not with asphalt. If this is the case, the driver finds it difficult to instantaneously locate the estimated path on the display image.

Second, the estimated path that is rendered in the display image is represented simply by lines, which fails to help the driver instantaneously perceive how far he/she can move the vehicle. More specifically, as shown in FIG. 21, a vehicle Vusr carrying the conventional drive assistant device is moving toward an obstacle Vbst. In this case, the vehicle Vusr first collides into a corner point Pcnr of the obstacle Vbst, not intersection points Pcrg of an estimated path Pp and the surface of the obstacle Vbst. This means that the farthest point possible for the vehicle Vusr to move is the corner point Pcnr of the obstacle Vbst. As such, even if the estimated path is so rendered as to end immediately before the object, the second problem remains yet unsolved.

SUMMARY OF THE INVENTION

Therefore, an object of the present invention is to provide a rendering device which generates display image that shows an estimated path in an eye-catching manner for the driver to easily locate.

Another object of the present invention is to provide a rendering device which generates display image generated that is indicative and helpful for the driver to know how far he/she can move the vehicle.

The present invention has the following features to attain the above-described objects.

A first aspect of the present invention is directed to a rendering device for generating a display image of an area around a vehicle for drive assistance. The rendering device comprises a reception part for receiving a current rudder angle of a steering wheel of the vehicle from a rudder angle sensor fixed in the vehicle; a derivation part for deriving an estimated path for the vehicle to take based on the rudder angle received by the reception part; and an image generation part for generating the display image based on a captured image which is captured by an image capture device fixed in the vehicle, and the estimated path that is derived by the derivation part. Here, in the display image, the estimated path is overlaid on an intermittent basis.

A second aspect of the present invention is directed to a rendering device for generating a display image of an area around a vehicle for drive assistance. The rendering device comprises a first reception part for receiving a distance to an obstacle that is located around the vehicle from a measuring sensor placed in the vehicle; a first derivation part for deriving a farthest point for the vehicle to move based on the distance received by the first reception part; a second reception part for receiving a current rudder angle of a steering wheel of the vehicle from a rudder angle sensor fixed in the vehicle; a second derivation part for deriving an estimated path for the vehicle to take based on the rudder angle received by the second reception part; and an image generation part for generating the display image based on a captured image which is captured by an image capture device fixed in the vehicle, the farthest point derived by the first derivation part, and the estimated path derived by the second derivation part.

These and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a block diagram showing the hardware structure of a rendering device Urnd2 according to a second embodiment of the present invention;

FIG. 11 is a diagram showing a display image Sout generated by a processor 21 of FIG. 10;

FIG. 19 is a detailed diagram showing an estimated region Rpt generated in step S410 in FIG. 16;

DETAILED DESCRIPTION OF THE INVENTION

Figure 1:
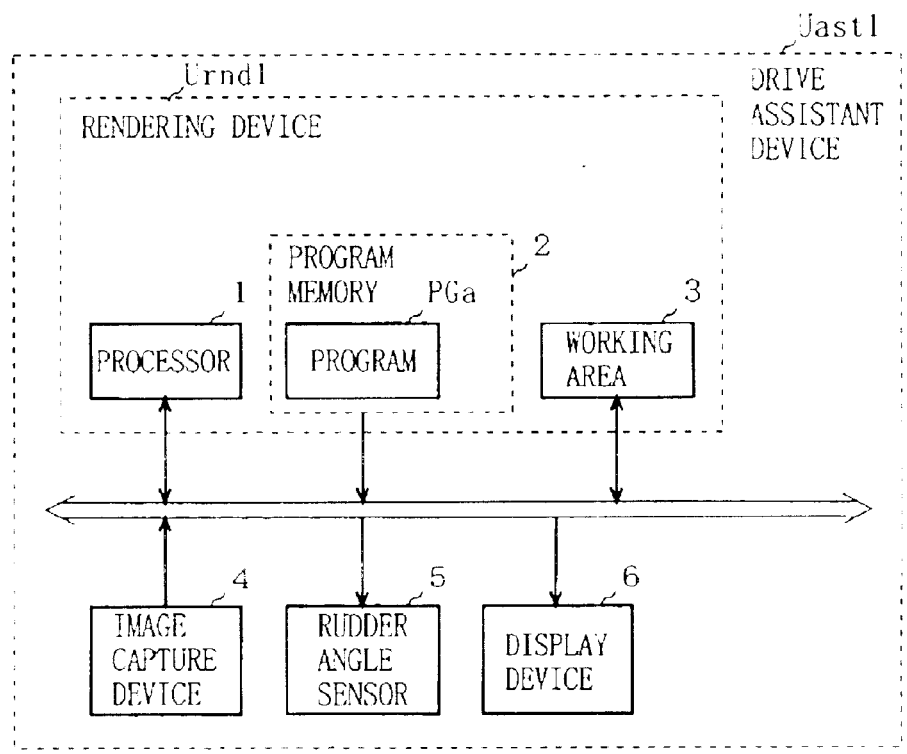
FIG. 1 is a block diagram showing the hardware structure of a rendering device Urnd1 according to a first embodiment of the present invention.
Figure 2:
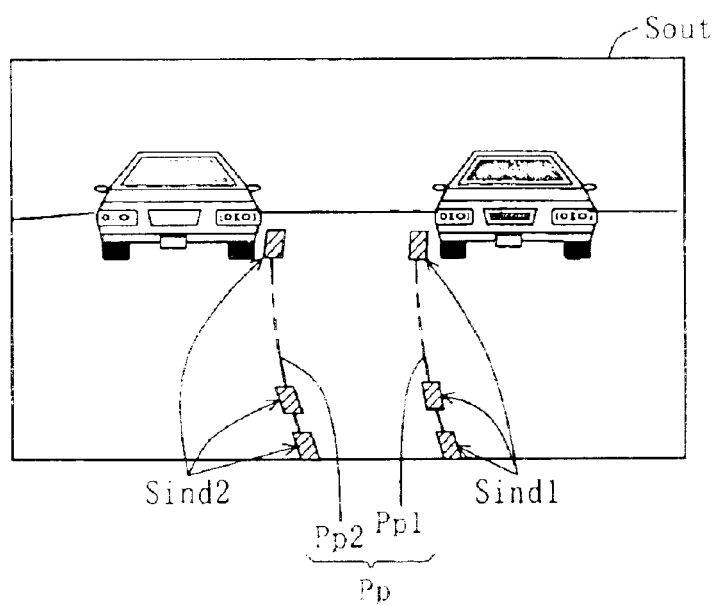
FIG. 2 is a diagram showing a display image Sout generated by a processor 1 of FIG. 1.

FIG. 1 is a block diagram showing the hardware structure of a rendering device Urnd1 according to a first embodiment of the present invention. In FIG. 1, the rendering device Urnd1 includes a processor 1, a program memory 2, and a working area 3. The program memory 2 is typified by ROM (Read Only Memory), and stores a program PGa for defining the processing procedure in the processor 1. By following the program PGa, the processor 1 generates a display image such as the display image Sout as shown in FIG. 2. The display image Sout shows an estimated path Pp for a vehicle Vusr (see FIG. 3) to take in the course of time. The estimated path Pp is composed of a left-side trajectory Pp1 and a right-side trajectory Pp2 which are indicated by indicators Sind1 and Sind2, respectively. Here, the left-side trajectory Pp1 is for a left-rear wheel of the vehicle Vusr, while the right-side trajectory Pp2 is for a right-rear wheel of the vehicle. Further, the indicators Sind1 and Sind2 are both objects in a predetermined shape (e.g., circle, rectangle) that is previously stored in the program memory 2.

The working area 3 is typified by RAM (Random Access Memory), and used when the processor 1 executes the program PGa. The rendering device Urnd1 according to the above-described structure is typically incorporated in a drive assistant device Uast1. The drive assistant device Uast1 is mounted in the vehicle Vusr, and includes at least one image capture device 4, a rudder angle sensor 5, and a display device 6 together with the rendering device Urnd1.

Figure 3:
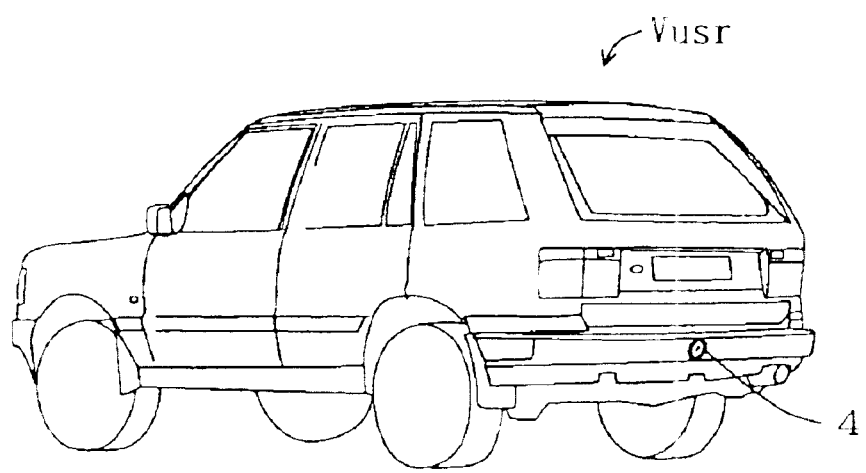
FIG. 3 is a diagram showing a position where an image capture device 4 of FIG. 1 is placed.
Figure 4:
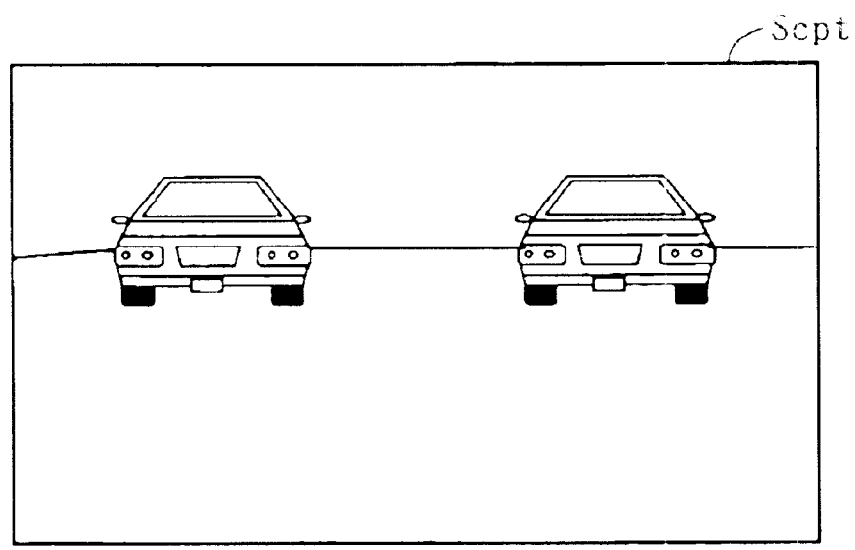
FIG. 4 is a diagram showing a captured image Scpt captured by the image capture device 4 of FIG. 1.

As shown in FIG. 3, the image capture device 4 is embedded in the rear-end of the vehicle Vusr, and captures an image covering an area to the rear of the vehicle Vusr. The resulting image is a captured image Scpt as shown in FIG. 4. The rudder angle sensor 5 detects a rudder angle $\theta$ of the steering wheel of the vehicle Vusr, and transmits the rudder angle $\theta$ to the processor 1. The rudder angle $\theta$ here indicates at what angle the steering wheel is turned with respect to the initial position. The steering wheel is considered to be in the initial position when the steering wheel is not turned, that is, when the vehicle Vusr is in the straight-ahead position. The display device 6 is typically a liquid crystal display.

Described next is the operation of the drive assistant device Uast1. When the driver wants assistance from the drive assistant device Uast1, the processor 1 starts executing the program PGa.

Figure 5:
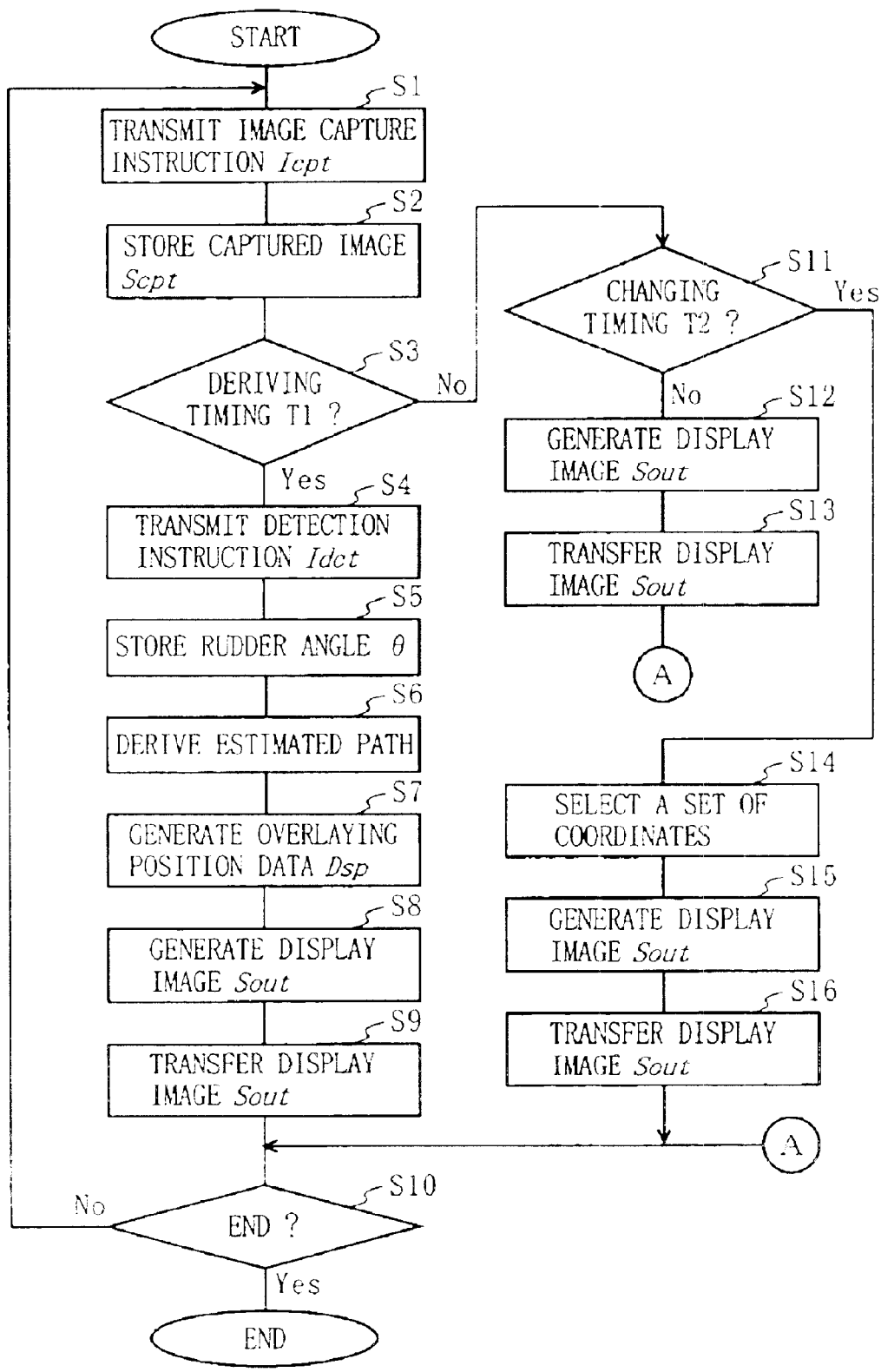
FIG. 5 is a flowchart showing the processing procedure of the processor 1 of FIG. 1.

Refer now to a flowchart in FIG. 5 for the processing procedure in the processor 1 written in the program PGa. In FIG. 5, the processor 1 first generates an image capture instruction Icpt, and transmits the image capture instruction Icpt to the image capture device 4 (step S1). Here, as shown in FIG. 5, the procedure returns to step S1 after step S10 is completed, and the processor 1 generates another image capture instruction Icpt. The program PGa is written so that a time interval between those two image capture instructions Icpt is substantially a t1 second. Here, the value of t1 is selected so as to allow the display device 6 to display the display image Sout for 30 frames per second. Herein, the image capture instruction Icpt is a signal instructing the image capture device 4 for image capturing. The image capture device 4 responsively captures a captured image Scpt such as shown in FIG. 4, and stores the captured image Scpt in frame memory (not shown) reserved in the working area 3 (step S2).

The processor 1 then watches a deriving timing T1 (step S3). This deriving timing T1 is previously written in the program PGa, and allows the processor 1 to derive the left- and right-side trajectories Pp1 and Pp2 once every t2 second. The value of t2 is selected to be larger than that of t1 (e.g., 0.1 second) since a change on a time base in the rudder angle $\theta$ is small.

In the deriving timing T1, the processor 1 generates a detection instruction Idtc, and transmits the detection instruction Idtc to the rudder angle sensor 5 (step S4). The detection instruction Idtc is a signal instructing the rudder angle sensor 5 to detect the rudder angle $\theta$. The rudder angle sensor 5 responsively detects the rudder angle 8, and stores the rudder angle $\theta$ in the working area 3 (step S5).

Based on the detected rudder angle $\theta$, the processor 1 derives the left- and right-side trajectories Pp1 and Pp2 (step S6). More specifically, derived by the processor 1 here are equations respectively for the left- and right-side trajectories Pp1 and Pp2 under Ackermann's model. Here, in the strict sense, the left- and right-side trajectories Pp1 and Pp2 are defined as being trajectories that are traced by left- and right-rear wheels of the vehicle Vusr on the condition that the driver keeps the steering wheel at the currently derived rudder angle $\theta$. The left-side trajectory Pp1 that is calculated by such an equation becomes an arc in a predetermined length. In more detail, the arc is a segment of a circle which is traceable by the vehicle Vusr around a center of the circle.

The radius of the circle is equal to a distance from the center of the circle to a point having a rotation center of the left-rear wheel projected onto the road surface. The equation for the right-side trajectory Pp2 is similar except that the arc is traced by the right-rear wheel, on its rotation center, of the vehicle Vusr.

Figure 6:
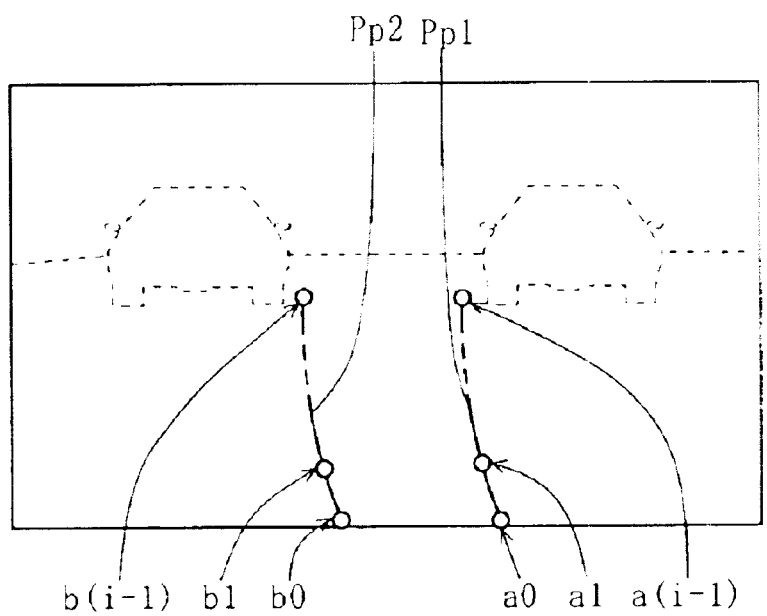
FIG. 6 is a diagram showing a left-side trajectory Pp1 and a right-side trajectory Pp2 derived in step S6 in FIG. 5.
Figure 7:
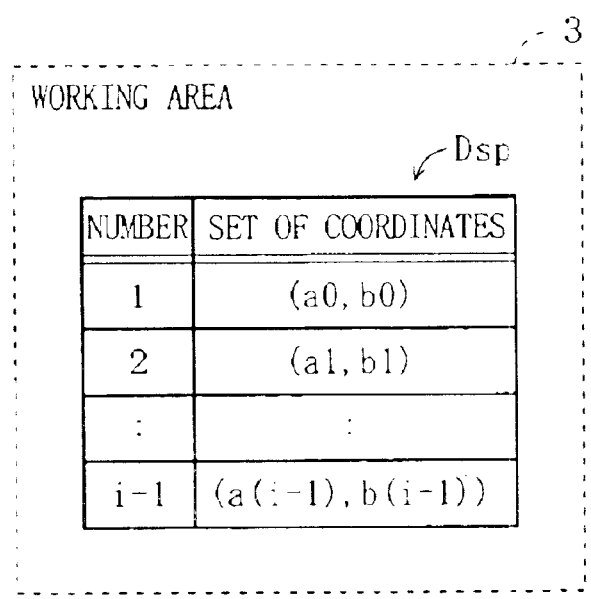
FIG. 7 is a diagram showing overlaying position data Dsp generated in step S7 in FIG. 5.

Then, the processor 1 generates overlaying position data Dsp indicating where to overlay the two indicators Sind1 and Sind2, and stores the data Dsp in the working area 3 (step S7). As an example, the left- and right-side trajectories Pp1 and Pp2 as shown in FIG. 6 are derived in step S6, the processor 1 calculates two points a0 and b0 which are closest to the vehicle Vusr (not shown) on those trajectories Pp1 and Pp2, respectively. The processor 1 then calculates a point a1 which is a predetermined distance Δd away from the point a0 on the left-side trajectory Pp1, and a point b1 which is also the predetermined distance Δd away from the point b0 on the right-side trajectory Pp2. The processor 1 repeats the same processing until i (where i is a natural number being 2 or larger) sets of coordinates such as (a0, b0), (a1, b1), . . . , (a(i−1), b(i−i)) are calculated. The sets of coordinates are numbered starting from the one closest to the vehicle Vusr. Accordingly, as shown in FIG. 7, the overlaying position data Dsp including those numbered sets of coordinates are stored in the working area 3.

Figure 8:
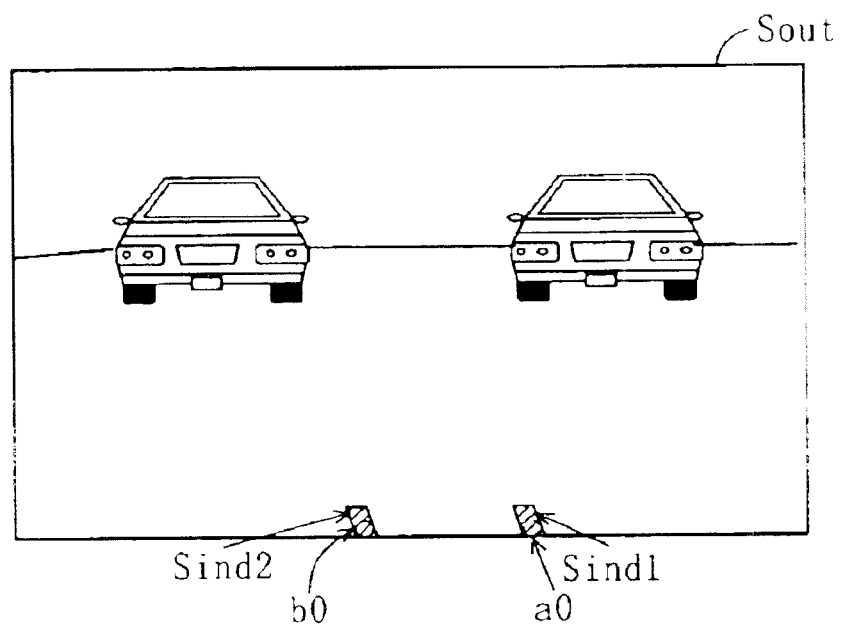
FIG. 8 is a diagram showing the display image Sout generated in step S8 in FIG. 5.

Based on the overlaying position data Dsp and the aforementioned captured image Scpt, the processor 1 then generates a frame of the display image Sout on the frame memory (step S8). Here, as already described with reference to FIG. 2, the display image Sout is the one having the indicators Sind1 and Sind2 overlaid on the captured image Scpt. In step S8, in more detail, the processor 1 first selects, from the overlaying position data Dsp generated in step S7, a set of coordinates which is not yet selected and which are the smallest in number. In this example, since a set has not yet been selected, the set of (a0, b0) is now selected. The processor 1 then overlays the indicators Sind1 and Sind2 onto the points a0 and b0 in the captured image Scpt on the frame memory. After this overlaying process, such a display image Sout as the one shown in FIG. 8 is generated for one frame on the frame memory.

The processor 1 then transfers the display image Sout on the frame memory to the display device 6 to be displayed thereon (step S9). In the current display image Sout on the display device 6, the indicator Sind1 is overlaid on the point a0 on the left-side trajectory Pp1, and the indicator Sind2 is overlaid on the point b0 on the right-side trajectory Pp2.

Then, the processor 1 determines whether it is now the time to end the processing of FIG. 5 (step S10). If the processor 1 determines that the processing should not end, the procedure returns to step S1 for generating another display image Sout. By the time steps S1 and S2 are completed, another captured image Scpt is newly stored on the frame memory. Then, in step S3, if the processor determines that the timing T1 has not come yet, the processor 1 then watches a timing T2 to change the overlaying positions of the indicators Sind1 and Sind2 (step S11). Here, the changing timing T2 is previously written in the program PGa, and allows the processor 1 to change the overlaying positions of the indicators Sind1 and Sind2 once every t3 second. If the value of T3 is set too small, the indicator Sind1 moves too fast from the point a0 to a1 for the driver to follow with her/his eyes on the display device 6. With consideration therefor, the value of t3 is selected to be larger than that of t1 (e.g., 0.05 second).

If the processor 1 determines that the timing T2 has not come yet, the processor 1 generates a frame of the display image Sout on the frame memory (step S12). This is based on the captured image Scpt stored in step S2 and the set of coordinates currently selected in the overlaying position data Dsp (in this example, the set of (a0, b0)). As such, the resulting display image Sout is also the one having the indicators Sind1 and Sind2 overlaid on the points a0 and b0 on the captured image Scpt. Then, the processor 1 transfers the generated display image Sout on the frame memory to the display device 6 to be displayed thereon (step S13).

Next, in step S10, if the processor 1 determines that it is now not the time to end the processing of FIG. 5, the procedure returns to step S1. By the time when steps S1 and S2 are completed, another captured image Scpt is newly stored on the frame memory. Then, in step S3, if the processor 1 determines that the timing T1 has not come yet, and in step S11, if the processor 1 determines that the timing T2 is now right, the procedure goes to step S14. Then, the processor 1 selects, from the overlaying position data Dsp on the working area 3, a set of coordinates which is not yet selected and which are the smallest in number (step S14). Since the set which was last selected is (a0, b0), the set (a1, b1) is now selected.

Figure 9:
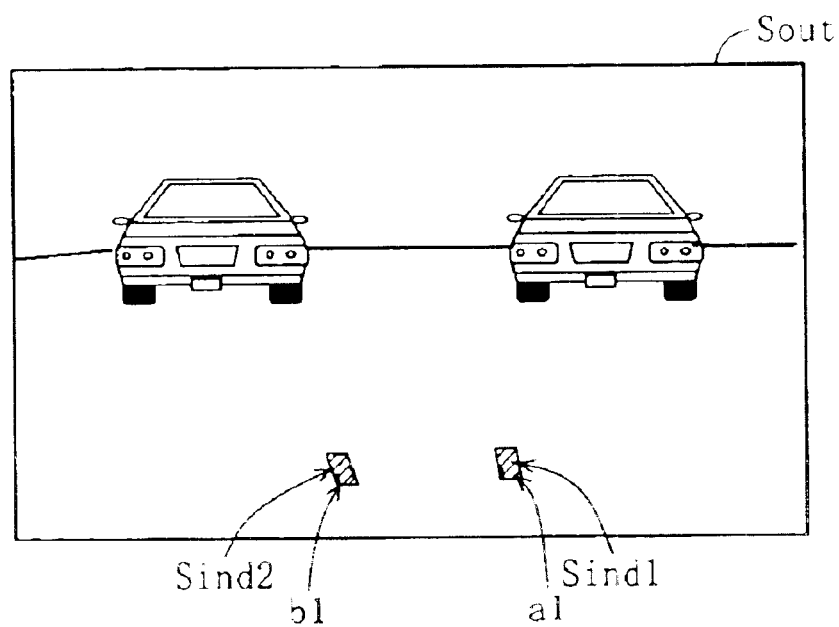
FIG. 9 is a diagram showing the display image Sout generated in step S15 in FIG. 5.

Next, the processor 1 generates a new frame of the display image Sout on the frame memory based on the captured image Scpt and the set of coordinates (in this example, the set of (a1, b1)) currently selected in the overlaying position data Dsp (step S15) As such, as shown in FIG. 9, the resulting display image Sout is the one having the indicators Sind1 and Sind2 overlaid on the points a1 and b1 on the captured image Scpt. Then, the processor 1 transfers the generated display image Sout on the frame memory to the display device 6 to be displayed thereon (step S16).

Such steps S1 to S16 are repeated until the determination in step S10 becomes Yes to end the processing of FIG. 5. In this manner, the overlaying positions of the indicators Sind1 and Sind2 change, in increments of the predetermined distance Δd, from the points a0 and b0 to a(i−1) and b(i−1), respectively. Thus, the indicators Sind1 and Sind2 are displayed as if moving in the same direction as the vehicle Vusr is heading towards along the left- and right-side trajectories Pp1 and Pp2. Advantageously, as the those indicators Sind1 and Sind2 are displayed on an intermittent basis, the left- and right-side trajectories Pp1 and Pp2 are also displayed on an intermittent basis on the display device 6. Accordingly, the left- and right-side trajectories Pp1 and Pp2 become more noticeable and are emphasized to a further degree. With such indicators Sind1 and Sind2, the driver can instantaneously locate the trajectories Pp1 and Pp2 in the display image Sout.

Further, every time the rudder angle θ is detected by the rudder angle sensor 5 according to the deriving timing T1, the processor 1 derives the left- and right-trajectories Pp1 and Pp2 based on the current rudder angle θ. In this manner, the trajectories Pp1 and Pp2 displayed on the display device 6 always become responsive to the driver's steering.

Note that, in the first embodiment, the changing timing T2 may be variable. For example, in the case where the overlaying positions of the indicators Sind1 and Sind2 are relatively close to the vehicle Vusr, the program PGa may be written so that the changing timing T2 comes earlier. If so, the left- and right-side trajectories Pp1 and Pp2 become easier to notice.

Further, in the first embodiment, the predetermined distance Δd between two successive points of aj and a (j+1) is constant on the left-side trajectory Pp1. Here, the value j is a positive integer between 0 and (i−1). The predetermined distance Δd may not necessarily be constant. For example, in the case where the point aj is relatively close to the vehicle Vusr, the program PGa may be written so that the predetermined distance Δ d is set to be relatively small so as to cause the processor 1 to select the point a (j+1). Conversely, the program PGa may be written so that the predetermined distance Δd is set to be relatively large so as to cause the processor 1 to select the point a (j+1). In both cases, the left- and right-side trajectories Pp1 and Pp2 become conspicuous to a further degree.

FIG. 10 is a block diagram showing the hardware structure of a rendering device Urnd2 according to a second embodiment of the present invention. In FIG. 10, the rendering device Urnd2 includes a processor 21, a program memory 22, and a working area 23. The program memory 22 is typified by ROM (Read Only Memory), and stores a program PGb for defining the processing procedure in the processor 21. By following the program PGb, the processor 21 generates a display image Sout such as the one shown in FIG. 11. The display image Sout shows an estimated path Pp of the vehicle Vusr (see FIG. 3) to be traced by a left-rear wheel of the vehicle Vusr. The estimated path Pp is displayed only during a display time period Pdt, which will be described later.

The working area 3 is typified by RAM (Random Access Memory), and is used when the processor 21 executes the program PGb. The rendering device Urnd2 according to the above-described structure is typically incorporated in a drive assistant device Uast2. Here, as to the drive assistant device Uast2, the only structural difference from the drive assistant device Uast1 of the first embodiment is that the drive assistance Uast2 includes the rendering device Urnd2 instead of the rendering device Urnd1. Thus, any component illustrated in FIG. 1 has the same reference numeral in FIG. 10, and therefore is not described again.

Described next is the operation of the drive assistant device Uast2. When the driver wants assistance from the drive assistant device Uast2, the processor 21 starts executing the program PGb in the program memory 22.

Figure 12:
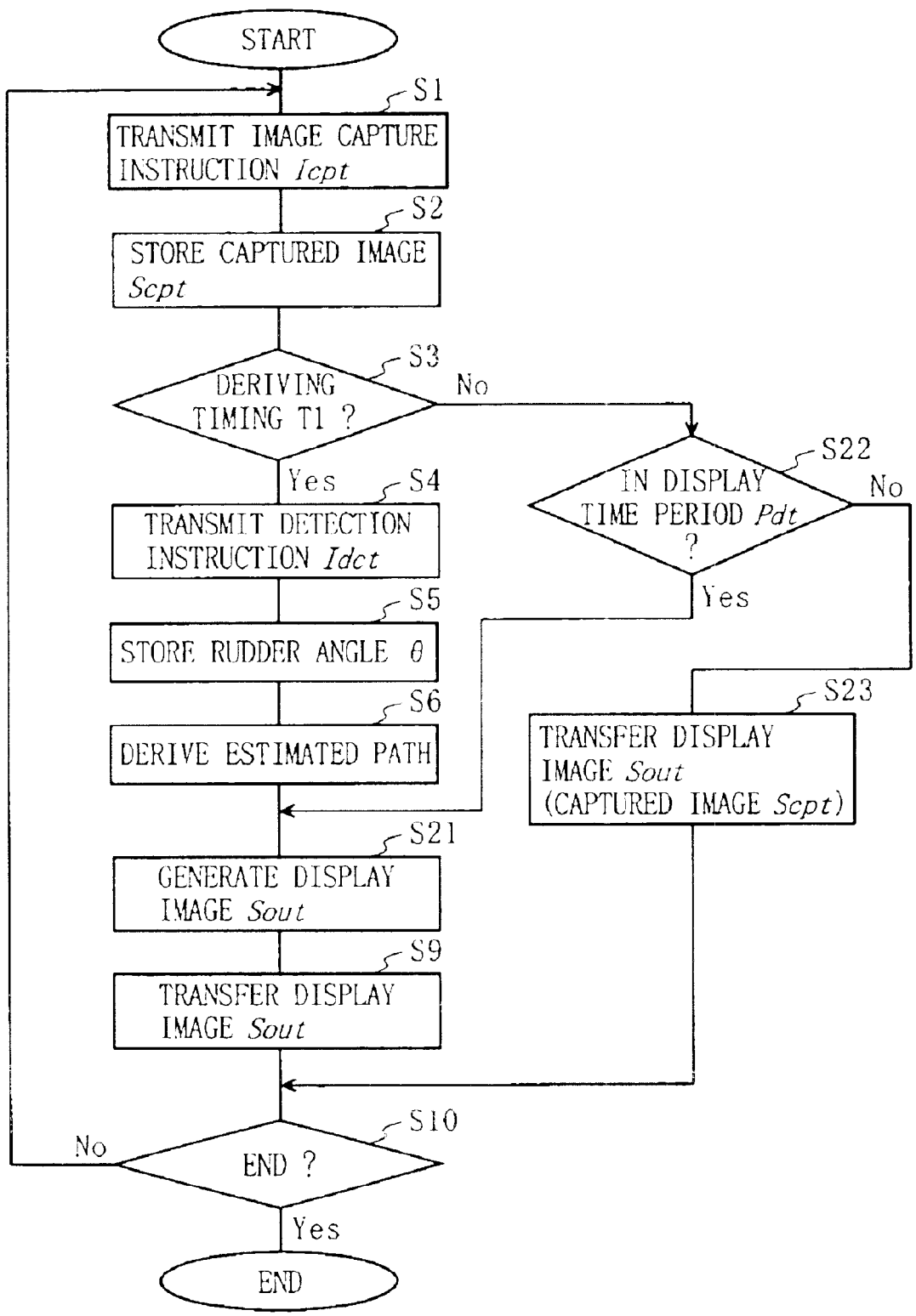
FIG. 12 is a flowchart showing the processing procedure of the processor 21 of FIG. 10.

Refer now to a flowchart in FIG. 12 for the processing procedure in the processor 21 written in the program PGb. Compared with FIG. 5, the flowchart of FIG. 12 includes the same steps, and thus those steps having the same step numbers are identical and thus are not described again.

First, by going through steps S1 to S6, the processor 21 derives an equation for the estimated path Pp. The procedure then goes to step S21, and the processor 21 generates the display image Sout based on the captured image Scpt stored in step S2 and the estimated path Pp derived in step S6. More specifically, the processor 21 renders the derived estimated path Pp in its entirety on the display image Sout, and the resulting display image Sout looks like the one shown in FIG. 11.

The procedure then goes to step S9, and the processor 21 transfers the display image Sout currently on the frame memory to the display device 6 to be displayed thereon. Then, the processor 21 determines whether it is now the time to end the processing of FIG. 12 (step S10), and if the processor 1 determines that the processing should not end now, the procedure returns to step S1 for generating another display image Sout on the frame memory. By the time when steps S1 and S2 are completed, another captured image Scpt is newly stored on the frame memory. Then, in step S3, if the processor 1 determines that the timing T1 has not come yet, the processor 1 then determines whether it is now in the display time period Pdt for the estimated path Pp (step 522).

Here, the display time period Pdf is previously written in the program PGb, and comes every t4 second in the second embodiment. This means that the estimated path Pp appears on and disappears from the display with a time lapse of t4 second. Note that, if the value of t4 is set too small, the appearance and disappearance of the estimated path Pp will be too swift for the driver to notice. With consideration therefor, the value of t4 is selected to be larger than that of t1 (e.g., 0.1 second).

If the processor 21 determines that it is now in the display time period Pdt, the procedure goes to step S21. The processor 21 then generates, on the frame memory, the display image Sout including the estimated path Pp (see FIG. 11). The procedure then goes to step S9, and the processor 21 transfers the current display image Sout on the frame memory to the display device 6 to be displayed thereon. Then, the processor 21 determines whether it is now the time to end the processing of FIG. 12 (step S10), and if the processor 1 determines that the processing should not end now, the procedure returns to step S1 for generating another display image Sout. In step S3, if the processor 21 determines that the deriving timing T1 has not come yet, and in step S22, if the processor 1 determines that the present time is not in the display time period Pdt, the procedure goes to step S23. In step 23, the processor 21 transfers, to the display device 6 to be displayed thereon, the captured image Scpt stored in step S2 (see FIG. 4) as the display image Sout without any changes thereto (step S23).

Such steps S1 to S23 are repeated until the determination in step S10 becomes Yes to end the processing of FIG. 12 in this manner, the estimated path Pp is displayed only during the display time period Pdt. The estimated path Pp appears on and disappears from the display on an intermittent basis. Accordingly, the estimated path Pp becomes noticeable, and the driver finds it easy to locate the estimated path Pp in the display image Sout.

Figure 13:
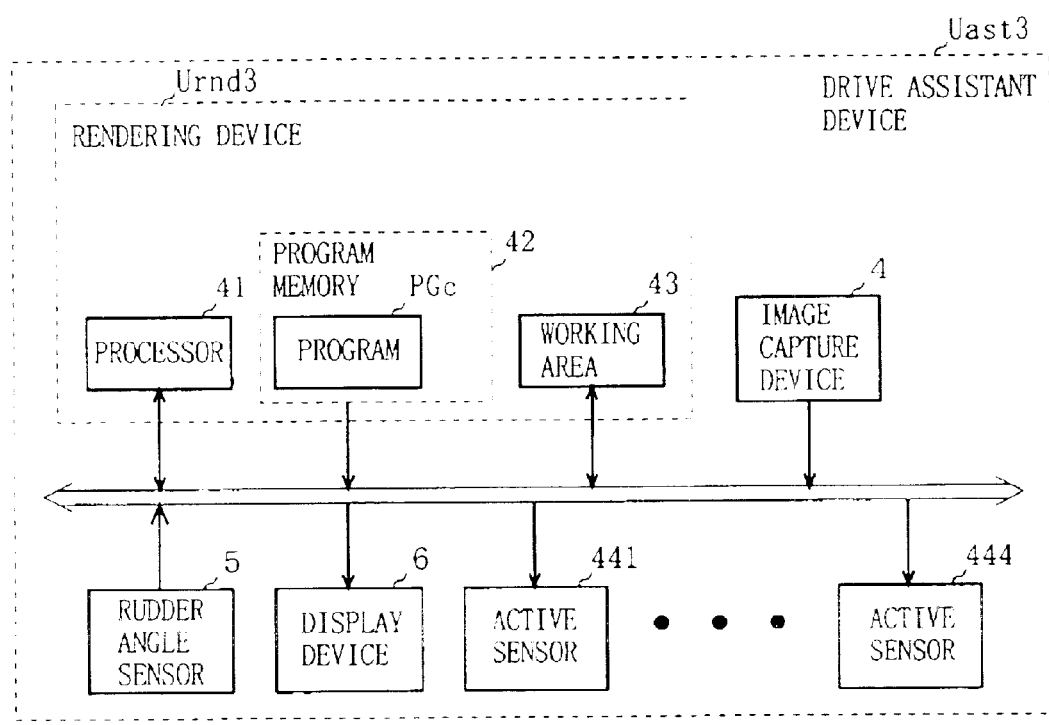
FIG. 13 is a block diagram showing the hardware structure of a rendering device Urnd3 according to a third embodiment of the present invention.
Figure 14:
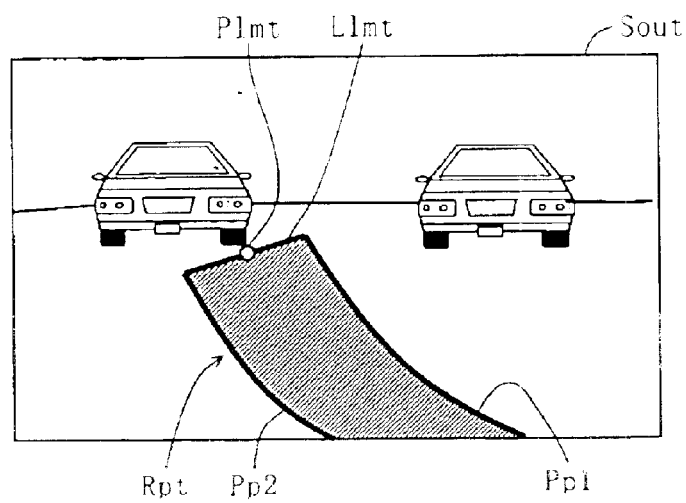
FIG. 14 is a diagram showing a display image Sout generated by a processor 41 of FIG. 13.

FIG. 13 is a block diagram showing the hardware structure of a rendering device Urnd3 according to a third embodiment of the present invention. In FIG. 13, the rendering device Urnd3 includes a processor 41, a program memory 42, and a working area 43. The program memory 42 is typified by ROM (Read Only Memory), and stores a program PGc for defining the processing procedure in the processor 41. By following the program PGc, the processor 41 generates a display image Sout such as the one shown in FIG. 14. The display image Sout shows an estimated region Rpt on a road surface Frd for the vehicle Vusr (see FIG. 3) to move. Specifically, the estimated region Rpt is defined by the left- and right-side trajectories Pp1 and Pp2 described above in the first embodiment, and a line segment Llmt passing through a no-go point Plmt. Here, the no-go point Plmt is a point indicating the farthest limit for the vehicle Vusr to move, and if the vehicle Vusr keeps moving, the vehicle might first collide into the obstacle Vbst.

The working area 43 is typified by RAM (Random Access Memory), and is used when the processor 41 executes the program PGc. The rendering device Urnd3 according to the above-described structure is typically incorporated in a drive assistant device Uast3. Here, as to the drive assistant device Uast3, the structural difference between the drive assistant device Uast1 and the drive assistant device Uast3 is that the drive assistant device Uast3 includes the rendering device Urnd3 instead of the rendering device Urnd1, and further includes four active sensors 441 to 444, which is exemplified herein as a measuring sensor. These are the only structural differences, and thus any component illustrated in FIG. 1 has the same reference numeral in FIG. 13, and therefore is not described again.

Figure 15:
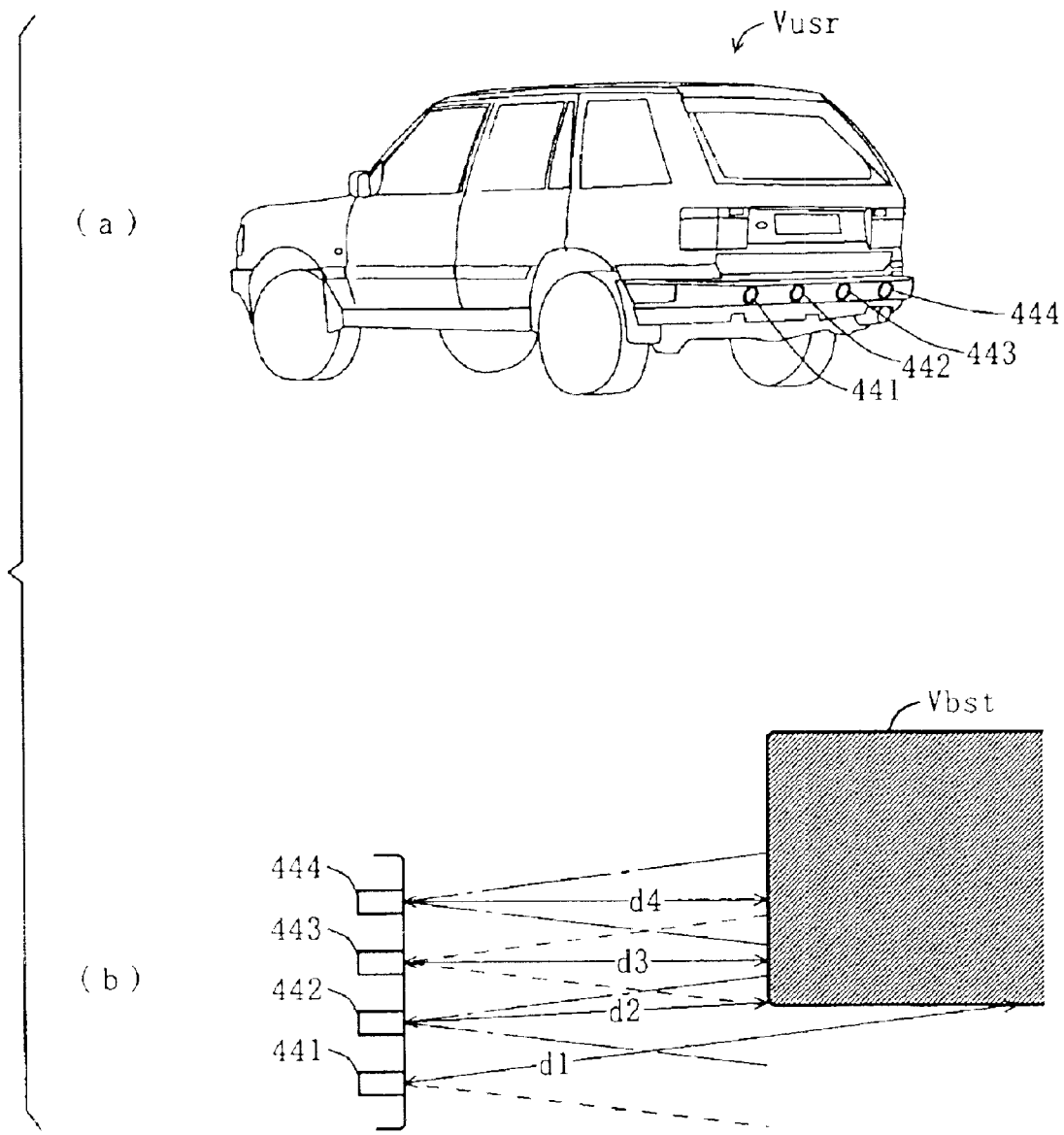
FIGS. 15A and 15B are diagrams showing placement positions of active sensors 441 to 444 of FIG. 13.

As shown in FIG. 15A, the active sensors 441 to 444 are embedded in the rear-end of the vehicle Vusr, preferably, in a lateral direction. The active sensors 441 to 444 thus arranged emit ultrasonic waves or radio waves toward the area to the rear of the vehicle Vusr, and monitor reflected waves. Thereby, as shown in FIG. 15B, distances d1 to d4 to an obstacle Vbst located closest behind the vehicle Vusr are detected by the active sensors 441 to 444.

Described next is the operation of the drive assistant device Uast3. When the driver wants assistance from the drive assistant device Uast3, the processor 41 starts executing the program PGc in the program memory 42.

Figure 16:
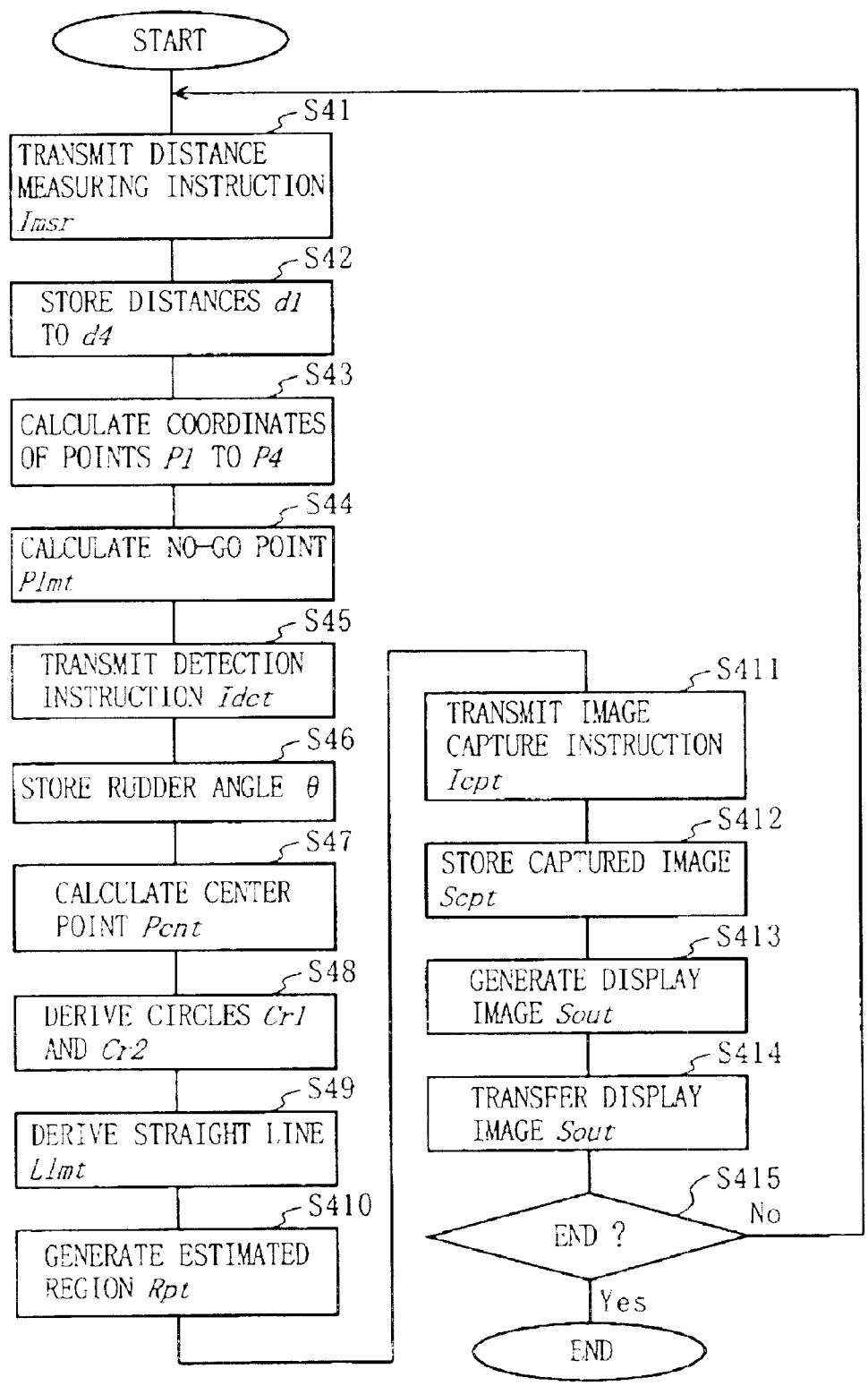
FIG. 16 is a flowchart showing the processing procedure of the processor 41 of FIG. 13.

Refer now to a flowchart in FIG. 16 for the processing procedure in the processor 41 written in the program PGc. In FIG. 16, the processor 41 first generates a distance measuring instruction Imsr, and transmits the distance measuring instruction Imsr to all of the active sensors 441 to 444 (step S41). Here, the distance measuring instruction Imsr is a signal to instruct all of the active sensors 441 to 444 to detect the distances d1 to d4, and to transmit those distances to the processor 41. The active sensors 441 to 444 each responsively perform such detection, and store the resultant distances d1 to d4 to the working area 43 (step S42).

Figure 17:
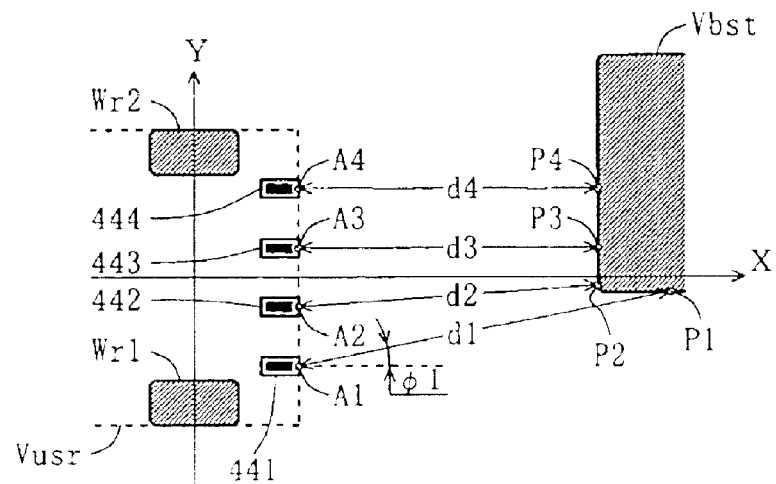
FIG. 17 is a diagram for demonstrating the process in step S43 in FIG. 16.

Next, based on the detected distances d1 to d4, the processor 41 calculates coordinates (x1, y1) to (x4, y4) of four points P1 to P4 on the surface of the object Vbst (step S43). Referring to FIG. 17, the process in step S43 is described in detail. FIG. 17 shows the vehicle Vusr, the obstacle Vbst, and a two-dimensional (2D) coordinate system. In the 2D coordinate system, the Y-axis connects a rotation center of a left-rear wheel Wr1 and that of a right-rear wheel Wr2. With respect to the Y-axis, the X-axis is a perpendicular bisector parallel to a horizontal plane. As described above, the active sensors 441 to 444 are securely placed in the vehicle Vusr. Therefore, positions A1 to A4 of the active sensors 441 to 444 from which the ultra sonic waves, for example, are emitted can be all defined by coordinates (xa1, ya1) to (xa4, ya4) that are known in the 2D coordinate system. Also, angles $\phi1$ to $\phi4$ at which the active sensors 441 to 444 emit the ultrasonic waves are known. In the third embodiment, the angles $\phi1$ to $\phi4$ are formed by the X-axis and the emitted waves, and FIG. 17 exemplarily shows only the angle $\phi1$. As such, the above coordinates (x1, y1) is equal to (d1·cos$\phi1$+xa1, d1·sin $\phi1$+ya1), and those coordinates (x2, y2) to (x4 to y4) are equal to (d2·cos $\phi2$+xa2, d2·sin$\phi2$+ya2) to (d4·cos $\phi4$+xa4, d4·sin $\phi4$+ya4), respectively.

Figure 18:
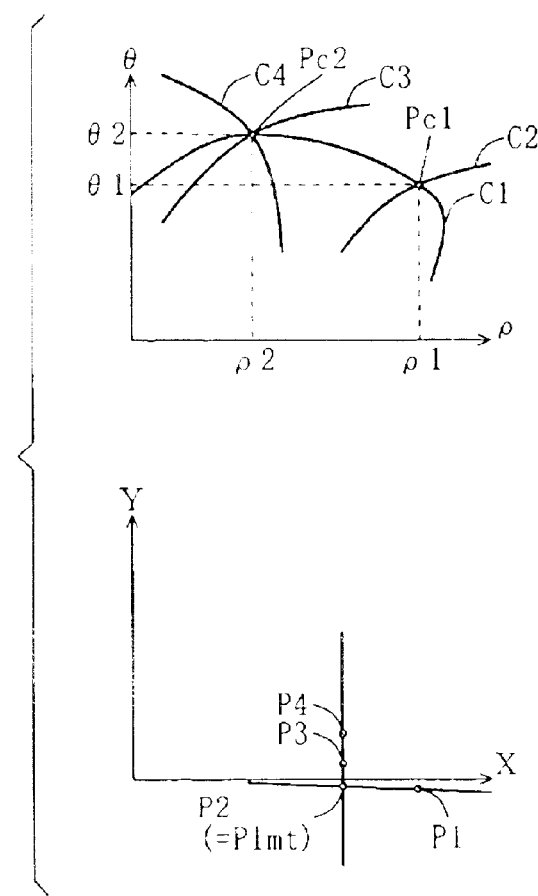
FIG. 18 is a diagram for demonstrating the process in step S44 in FIG. 16.
Figure 20:
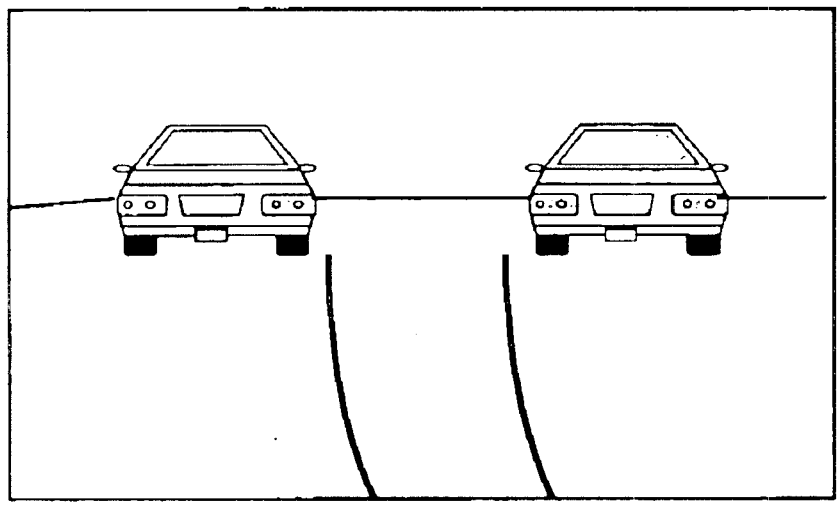
FIG. 20 is a diagram showing a display image displayed by a conventional drive assistant device.
Figure 21:
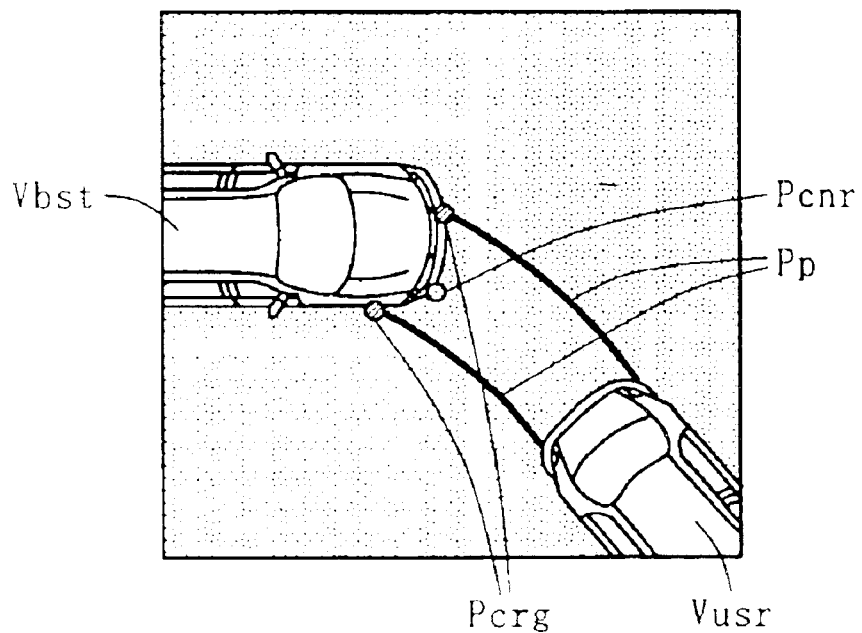
FIG. 21 is a diagram for explaining problems unsolvable by the conventional drive assistant device.

Then, based on the calculated four points P1 to P4, the processor 41 calculates coordinates (xlmt, ylmt) of the corner point Pcnr of the obstacle Vbst as one example of the no-go point Plmt (step S44). By referring to FIG. 18, the process in step S44 is now described in detail. The processor 41 first performs a Hough transform with respect to the points P1 to P4 so that curves C1 to C4 are derived in the Hough space which is defined by the ρ-axis and θ-axis. Here, the curves C1 to C4 are expressed as the following equations (1) to (4), respectively.

$$\rho = x1 \cdot \cos \theta + y1 \cdot \sin \theta \quad (1)$$

$$\rho = x2 \cdot \cos \theta + y2 \cdot \sin \theta \quad (2)$$

$$\rho = x3 \cdot \cos \theta + y3 \cdot \sin \theta \quad (3)$$

$$\rho = x4 \cdot \cos \theta + y4 \cdot \sin \theta \quad (4)$$

According to the above equations (1) and (2), the processor 41 calculates coordinates (ρ1, θ1) of an intersection point Pc1 of the curves C1 and C2 in the Hough space, and according to the equations (2) to (4), the processor 41 calculates coordinates (ρ2, θ2) of an intersection point Pc2 of the curves C2 to C4 in the Hough space. From the intersection point Pc1, the processor 41 then derives an equation for a straight line P1 P2. Here, the line P1 P2 is expressed by the following equation (5) on the 2D coordinate system. Similarly, a line P2 P4 is expressed by the following equation (6).

$$y = (-\cos \theta 1 \cdot x + \rho 1)/\sin \theta 1 \quad (5)$$

$$y = (-\cos \theta 2 \cdot x + \rho 2)/\sin \theta 2 \quad (6)$$

From those equations (5) and (6), the processor 41 calculates coordinates of an intersection point of the line P1 P2 and the line P2 P3, and the resulting coordinates are determined as the above-mentioned coordinates (xlmt, ylmt).

By similarly going through steps S4 and S5 of FIG. 5, the processor 14 receives the current rudder angle θ of the vehicle Vusr (steps S45 and S46).

The processor 41 then calculates, in the 2D coordinate system, coordinates (xcnt, ycnt) of a center point Pcnt (see FIG. 19) of the circle traceable by the vehicle Vusr when rotated (step S47). The processor 41 also derives equations for circles Cr1 and Cr2, which are traced respectively by the left- and right-rear wheels Wr1 and Wr2, on each rotation center, of the vehicle Vusr when rotated around the center point Pcnt (step S48). Here, since the coordinates (xcnt, ycnt) and the equations for the circles Cr1 and Cr2 are easily calculated under the well-known Ackermann's model, steps S47 and S48 are not described in detail. Further, the circles Cr1 and Cr2 include the left- and right-side trajectories Pp1 and Pp2 described above in the first embodiment.

The processor 41 then derives an equation for a straight line Llmt, which passes through the coordinates (xcnr, ycnr) calculated in step S44, and the coordinates (xcnt, ycnt) calculated in step S47 (step S49). Herein, the straight line Llmt specifies the farthest limit for the vehicle Vusr to move without colliding with the obstacle Vbst.

The processor 41 next generates the estimated region Rpt, which is a region that is enclosed by the circles Cr1 and Cr2 calculated in step S48, the straight line Llmt calculated in step S49, and a line segment Lr12 (step S410). Here, the line segment Lr12 is the one which connects the rotation centers of the left- and right-rear wheels Wr1 and Wr2.

By similarly going through steps S1 and S2 of FIG. 5, the processor 41 receives the captured image Scpt from the image capture device 4 (steps S411, S412). Based on the captured image Scpt and the estimated region Rpt generated in step S410, the processor 41 then generates the display image Sout on the frame memory. More specifically, the processor 41 deforms the estimated region Rpt to the one viewed from the image capture device 4, and renders the estimated region Rpf on the captured image Scpt. The resulting display image Sout looks like the one shown in FIG. 14. The processor 41 then transfers the display image Sout on the frame memory to the display device 6 to be displayed thereon (step S414). Such steps S41 to S414 are repeated until the determination becomes Yes in step S415 to end the processing of FIG. 16. As such, as the estimated region Rpt extends to the no-go point Plmt, the driver can instantaneously know the farthest limit to move the vehicle Vusr.

In the first to third embodiments as described above, the image capture device 4 is embedded in the rear-end of the vehicle Vusr. The present invention, however, is not restricted thereto, and the image capture device 4 can be embedded in the front-end of the vehicle Vusr. Further, the number of image capture devices 4 is not limited to one, and may be more than one depending on the design requirements of the drive assistant devices Uast1 to Uast3.

Still further, in the above-described embodiments, the captured image Scpt is the one on which the left- and right-side trajectories Pp1 and Pp2, the estimated path Pp, and the estimated region Rpt are rendered. Here, the captured image Scpt may be subjected to some image processing by the processors 1, 21, and 41 before having those rendered thereon. Such image processing is typified by processing of generating an image of an area around the vehicle Vusr viewed from a virtual viewpoint set high up in the vehicle Vusr.

Still further, in the first to third embodiments described above, the captured image Scpt is stored in the frame memory in response to the image capture instruction Icpt transmitted from the processors 1, 21, and 41 to the image capture device 4. The present invention, however, is not restricted thereto, and the captured image Scpt is voluntarily generated by the image capture device 4 and then stored in the frame memory. Similarly, the rudder angle θ may be detected voluntarily by the rudder angle sensor 5 without responding to the detection instruction Idct originating from the processors 1, 21, and 41.

Still further, in the third embodiment described above, four active sensors 441 to 444 are placed in the vehicle Vusr. The present invention, however, is not restricted thereto, and one or more active sensors may be placed in the vehicle Vusr. Here, if only one active sensor is placed in the vehicle Vusr, the direction of the lens thereof needs to be dynamically changed so that the angle φ of the emitted waves is set to be wider.

Still further, in the above-described third embodiment, the active sensors 441 to 444 are provided herein as one example of a measuring sensor for measuring the distances d1 to d4 to the obstacle Vbst. The present invention, however, is not restricted thereto, and another type of measuring sensor such as a passive sensor may be used. Here, to structure such an exemplary passive sensor, two image capture devices are required to cover the area to the rear of the vehicle Vusr. These image capture devices each pick up an image of the obstacle Vbst located behind the vehicle Vusr. Based on a parallax of the obstacle in images, the processor 41 then measures a distance to the obstacle Vbst with stereoscopic views (stereoscopic vision).

Still further, in the above-described embodiments, the programs PGa to PGc are stored in the rendering devices Urnd1 to Urnd3, respectively. The present invention, however, is not restricted thereto, and those programs PGa to PGc may be distributed in a recording medium typified by a CD-ROM, or over a communications network such as the Internet.

While the present invention has been described in detail, the foregoing description is in all aspects illustrative and not restrictive. It is to be understood that numerous other modifications and variations can be devised without departing from the scope of the invention.

What is claimed is:

1. A rendering device for generating a display image of an area around a vehicle for drive assistance, said rendering device comprising:

a reception part for receiving a current rudder angle of a steering wheel of the vehicle from a rudder angle sensor fixed in the vehicle;

a derivation part for deriving an estimated path for the vehicle to take based on the rudder angle received by said reception part; and an image generation part for generating the display image based on a captured image captured by an image capture device fixed in the vehicle and the estimated path derived by said derivation part, wherein said image generation part overlays the estimated path in the display image on an intermittent basis.

2. The rendering device according to claim 1, wherein the display image includes an indicator which moves along the estimated path in a direction in which the vehicle is heading towards.

3. The rendering device according to claim 1, wherein said image generation part overlays the estimated path on the captured image in a predetermined time period, but does not overlay the estimated path in other predetermined time periods.

4. A rendering device for generating a display image of an area around a vehicle for drive assistance, said rendering device comprising:

a first reception part for receiving a distance to an obstacle located around the vehicle from a measuring sensor placed in the vehicle;

a first derivation part for deriving a farthest point for the vehicle to move based on the distance received by said first reception part;

a second reception part for receiving a current rudder angle of a steering wheel of the vehicle from a rudder angle sensor fixed in the vehicle;

a second derivation part for deriving an estimated path for the vehicle to take based on the rudder angle received by said second reception part; and an image generation part for generating the display image based on a captured image captured by an image capture device fixed in the vehicle, the farthest point derived by said first derivation part, and the estimated path derived by said second derivation part.

5. A rendering method of generating a display image of an area around a vehicle for drive assistance, said rendering method comprising:

a reception operation of receiving a current rudder angle of a steering wheel of the vehicle from a rudder angle sensor fixed in the vehicle;

a derivation operation of deriving an estimated path for the vehicle to take based on the rudder angle received in said reception operation; and an image generation operation of generating the display image based on a captured image captured by an image capture device fixed in the vehicle and the estimated path derived in said derivation operation, wherein said image generation operation overlays the estimated path in the display image on an intermittent basis.

6. The rendering method according to claim 5, wherein the display image includes an indicator which moves along the estimated path in a direction in which the vehicle is heading towards.

7. The rendering method according to claim 5, wherein said image generation operation overlays the estimated path on the captured image only in a predetermined time period, but does not overlay the estimated path in other predetermined time periods.

8. A rendering method of generating a display image of an area around a vehicle for drive assistance, said rendering method comprising:

a first reception operation of receiving a distance to an obstacle located around the vehicle from a measuring sensor placed in the vehicle;

a first derivation operation of deriving a farthest point for the vehicle to move based on the distance received in said first reception operation;

a second reception operation of receiving a current rudder angle of a steering wheel of the vehicle from a rudder angle sensor fixed in the vehicle;

a second derivation operation of deriving an estimated path for the vehicle to take based on the rudder angle received in said second reception operation; and an image generation operation of generating the display image based on a captured image captured by an image capture device fixed in the vehicle, the farthest point derived in said first derivation operation, and the estimated path derived in said second derivation step operation.

9. A recording medium with a program recorded thereon for generating a display image of an area around a vehicle for drive assistance, said program comprising:

a reception operation of receiving a current rudder angle of a steering wheel of id the vehicle from a rudder angle sensor fixed in the vehicle;

a derivation operation of deriving an estimated path for the vehicle to take based on the rudder angle received in said reception operation; and an image generation operation of generating the display image based on a captured image captured by an image capture device fixed in the vehicle and the estimated path derived in said derivation operation, wherein said image generation operation overlays the estimated path in the display image on an intermittent basis.

10. The recording medium with the program recorded thereon according to claim 9, wherein the display image includes an indicator which moves along the estimated path in a direction in which the vehicle is heading towards.

11. The recording medium with the program recorded thereon according to claim 9, wherein said image generation operation overlays the estimated path on the captured image only in a predetermined time period, but does not overlay the estimated path in other predetermined time periods.

12. A recording medium with a program recorded thereon for generating a display image of an area around a vehicle for drive assistance, said program comprising:

a first reception operation of receiving a distance to an obstacle located around the vehicle from a measuring sensor placed in the vehicle;

a first derivation operation of deriving a farthest point for the vehicle to move based on the distance received in said first reception operation;

a second reception operation of receiving a current rudder angle of a steering wheel of the vehicle from a rudder angle sensor fixed in the vehicle;

a second derivation operation of deriving an estimated path for the vehicle to take based on the rudder angle received in said second reception operation; and an image generation operation of generating the display image based on a captured image captured by an image capture device fixed in the vehicle, the farthest point derived in said first derivation operation, and the estimated path derived in said second derivation operation.

13. A program for generating a display image of an area around a vehicle for drive assistance, said program comprising:

a reception operation of receiving a current rudder angle of a steering wheel of the vehicle from a rudder angle sensor fixed in the vehicle;

a derivation operation of deriving an estimated path for the vehicle to take based on the rudder angle received in said reception operation; and an image generation operation of generating the display image based on a captured image captured by an image capture device fixed in the vehicle and the estimated path derived in said derivation operation, wherein said image generation operation overlays the estimated path in the display image on an intermittent basis.

14. The program according to claim 13, wherein the display image includes an indicator which moves along the estimated path in a direction in which the vehicle is heading towards.

15. The program according to claim 13, wherein said image generation operation overlays the estimated path on the captured image only in a predetermined time period.

16. A program for generating a display image of an area around a vehicle for drive assistance, said program comprising:

a first reception operation of receiving a distance to an obstacle located around the vehicle from a measuring sensor placed in the vehicle;

a first derivation operation of deriving a farthest point for the vehicle to move based on the distance received in said first reception operation;

a second reception operation of receiving a current rudder angle of a steering wheel of the vehicle from a rudder angle sensor fixed in the vehicle;

a second derivation operation of deriving an estimated path for the vehicle to take based on the rudder angle received in said second reception operation; and an image generation operation of generating the display image based on a captured image captured by an image capture device fixed in the vehicle, the farthest point derived in said first derivation operation, and the estimated path derived in said second derivation operation.

* * * * *

UNITED STATES PATENT AND TRADEMARK OFFICE
CERTIFICATE OF CORRECTION

PATENT NO. : 6,825,779 B2
DATED : November 30, 2004
INVENTOR(S) : Nobuhiko Yasui et al.

It is certified that error appears in the above-identified patent and that said Letters Patent is hereby corrected as shown below:

Title page,
Item [56], References Cited, OTHER PUBLICATION, "Rear View Display Unit" reference, please replace "(JP 01-168583, Apr. 1989)" with -- (JP 01-168583, July 1989) --

Column 13,
Line 14, please delete "step" before "operation"
Line 19, please delete "id" before "the vehicle"

Signed and Sealed this

Twenty-ninth Day of March, 2005

JON W. DUDAS
*Director of the United States Patent and Trademark Office*